United States Patent
Primke et al.

(10) Patent No.: US 7,267,878 B2
(45) Date of Patent: Sep. 11, 2007

(54) HOT-MELT ADHESIVE IN PARTICULATE FORM

(75) Inventors: Hartmut Primke, Bopfingen (DE); Gerald Petry, Hueckelhoven (DE); Ingolf Scheffler, Neuss (DE); Juergen Wichelhaus, Wuppertal (DE); Michael Krebs, Hilden (DE); Michael Rudolph, Bopfingen (DE); Andrew Nixon, Meerbusch (DE); Hans-Peter Kohlstadt, Velbert (DE)

(73) Assignee: Henkel Kommanditgesellschaft auf Aktien (Henkel KGAA), Duesseldorf (DE)

( * ) Notice: Subject to any disclaimer, the term of this patent is extended or adjusted under 35 U.S.C. 154(b) by 409 days.

(21) Appl. No.: 10/703,341

(22) Filed: Nov. 7, 2003

(65) Prior Publication Data

US 2004/0143034 A1    Jul. 22, 2004

Related U.S. Application Data

(63) Continuation of application No. PCT/EP02/04729, filed on Apr. 30, 2002.

(30) Foreign Application Priority Data

May 9, 2001    (DE) ................ 101 22 437

(51) Int. Cl.
    *B32B 27/00*    (2006.01)
(52) U.S. Cl. ................ 428/423.1; 428/423.5; 428/423.7; 428/424.6; 156/331.7; 156/332; 427/208.2
(58) Field of Classification Search ............ 428/423.1, 428/423.5, 423.7, 424.6; 156/331.7, 332; 427/208.2
    See application file for complete search history.

(56) References Cited

U.S. PATENT DOCUMENTS

| | | | |
|---|---|---|---|
| 4,384,083 A * | 5/1983 | Baker ................ 525/420.5 |
| RE32,325 E | 1/1987 | Smith | |
| 5,472,785 A | 12/1995 | Stobbie, IV et al. | |
| 5,710,215 A | 1/1998 | Abend | |
| 5,776,406 A | 7/1998 | Schubert et al. | |
| 5,869,555 A | 2/1999 | Simmons et al. | |
| 5,906,704 A | 5/1999 | Matsuura et al. | |
| 5,942,569 A | 8/1999 | Simmons et al. | |
| 6,613,865 B1 | 9/2003 | Magunia et al. | |
| 6,716,527 B1 | 4/2004 | Czmok et al. | |

FOREIGN PATENT DOCUMENTS

| | | |
|---|---|---|
| CA | 2 392 960 A1 | 6/2001 |
| DE | 280 540 A1 | 7/1990 |
| DE | 44 46 027 A1 | 7/1996 |
| DE | 199 52 089 C1 | 4/2001 |
| DE | 195 41 923 C2 | 7/2001 |
| EP | 0 832 953 A2 | 4/1998 |
| JP | 11-228833 | 8/1999 |
| WO | WO93/25599 A1 | 12/1993 |
| WO | WO 00/47687 A1 | 8/2000 |
| WO | WO 01/27188 | 4/2001 |
| WO | WO 01/40342 A1 | 6/2001 |

OTHER PUBLICATIONS

Database WPI Section CH, Week 199944, Derwent Publications Ltd., London, GB; AN 1999-522892, XP002214075 of JP 11-228833 (Aug. 24, 1999).
Huber et al., "Shaping Reactive Hot Melts Using LMW Copolyesters", *Adhesives Age*, pp. 32-35 (1987).
Kleben & Dichten, "Kapazitive Fullstands-uberwachung an Granulat-Behaltern", *Adhasion*, pp. 26-28 (2001).
G. Habenicht, "Kleben, Grunlagen, Technologie, Anwendungen", 2nd Edition, Chapter 2.7.6, pp. 68-70 (1990).
"Shore A and Shore D hardness testing of rubber", DIN 53 505, Beuth Verlag GmbH, Berlin Germany, pp. 1-5 (2000).
Huber et al., Leitlinien fur die Formulierung von reaktiven Schmelzkebstoffen, 11, Munchener Klebstoff-und Veredelungsseminar, pp. 1-20 (1986).
"Standard Test Methods for Softening Point of Resins Derived from Navel Stores by Rings and Ball Apparatus", ASTM E 28, pp. 1-6 (2000).

* cited by examiner

*Primary Examiner*—Leszek Kiliman
(74) *Attorney, Agent, or Firm*—Woodcock Wasburn LLP

(57) ABSTRACT

A moisture-curing hot-melt-adhesive composition in granulate, tablet or powder form can be produced by
a.) fusing the reactive hot-melt-adhesive composition and heating the melt, subject to exclusion of moisture,
b.) extruding this melt through one or more dies onto a cooled surface, subject to exclusion of moisture,
c.) cooling the granulate, subject to exclusion of moisture, whereby the composition solidifies,
d.) removing the cooled hot-melt-adhesive granulate,
e.) filling the granulate into moisture-tight packages, subject to exclusion of moisture.
These reactive hot-melt adhesives are pourable and free-flowing and therefore can be used with all conventional application machines for hot-melt adhesives.

22 Claims, No Drawings

HOT-MELT ADHESIVE IN PARTICULATE FORM

This application is a continuation under 35 USC Sections 365(c) and 120 of International Application No. PCT/EP02/04729, filed 30 Apr. 2002, which claims priority from German Application No. DE 10122437.0, filed 9 May 2001, each of which is incorporated herein by reference in its entirety.

BACKGROUND OF THE INVENTION

1. Field of the Invention

The invention relates to a hot-melt adhesive composition in the form of a granulate or powder, wherein at least some of the polymeric constituents contain moisture-reactive groups. The invention further relates to a process for producing such hot-melt adhesives and also to a process for bonding planar objects or moldings by using a reactive granulate or powder. Such reactive hot-melt adhesives which undergo secondary crosslinking under the influence of moisture may contain isocyanate end groups by way of moisture-reactive groups or they may contain silane groups.

2. Discussion of the Related Art

Reactive, one-component, moisture-curing polyurethane hot-melt adhesives are moisture-curing or moisture-crosslinking adhesives which are solid at room temperature and which are applied as an adhesive in the form of their melt and which have polymeric constituents that contain urethane groups as well as reactive isocyanate groups. In like manner, moisture-curing or moisture-crosslinking hot-melt adhesives may contain silane groups by way of reactive groups; in principle, such groups may have been produced on the basis of polyurethane prepolymers, but they may also have been produced from polyamides and other polymers with the aid of organofunctional silanes by means of reactions analogous to polymerization. As a result of the cooling of this melt after it has been applied and after the substrate parts to be bonded have been joined, first of all a rapid physical setting of the hot-melt adhesive takes place by virtue of the solidification thereof. This is directly followed by a chemical reaction of the isocyanate groups or silane groups that are still present with moisture from the environment so as to produce a crosslinked infusible adhesive. Reactive hot-melt adhesives based on isocyanate-terminated or silane-terminated polyurethane prepolymers are described, for example, by H. F. Huber and H. Müller in "Shaping Reactive Hotmelts Using LMW Copolyesters", Adhesives Age, November 1987, pages 32 to 35.

Reactive polyurethane adhesives/sealants are distinguished by a very high performance profile. In recent years it has therefore been increasingly possible for new applications for these adhesives/sealants to be developed. Compositions for such adhesives and/or sealants are already known from a great many patent applications and other publications.

In addition to many advantages, these hot-melt-adhesive compositions also exhibit a number of disadvantages that are contingent upon the system. The moisture-curing hot-melt adhesives are very sensitive, depending on the system, to the ingress of moisture from the surrounding atmosphere. Therefore they are customarily packaged in moisture-proof casks, ordinarily being kept in these casks in the form of a compact block. This means that, at least in the case of large-volume application from barrels, barrel melt facilities are necessary for the application, so that the hot-melt adhesive has to be fused, subject to exclusion of moisture, and conveyed into the application unit. In respect of non-reactive hot-melt adhesives it has been known for a long time—and it is the state of the art—to offer them for sale not only in the form of compact blocks to be fused but also in the form of a free-flowing lumpy material, i.e. in the form of granulate, tablets, powder and similar particulate states. The advantages of such marketable forms consist in easy packaging and storage in bags, sacks or "BigBags"; moreover, such particulate hot-melt adhesives can be conveyed easily, be it by suction, pneumatic conveying or by charging into silos from which the particulate adhesive particles can fall directly into the fusing unit in free fall. It is therefore desirable also to be able to offer the moisture-reactive hot-melt adhesives for sale in pourable or free-flowing form.

Document DD 280 540 A1 describes a process for producing adhesive bonds by means of hot-melt adhesives. To this end, it is proposed that a first hot-melt adhesive preparation consisting of an EVA copolymer, a hydroxyl-functionalized and/or carboxyl-functionalized oligomer or high polymer and a second preparation consisting of an EVA copolymer, tackifying resins and a polyfunctional isocyanate in granulate form are premixed and then supplied to a fusing extruder in such a way that the dwell-time in the extruder at a temperature from 330 degrees K to 480 degrees K is maintained within the range from 10 s to 600 s and the mixing ratio of the two preparations amounts to 1:5 to 5:1 or both hot-melt-adhesive preparations are melted separately and mixed intensively shortly prior to application. One-component, moisture-curing hot-melt adhesives in granulate form are not disclosed in this document.

U.S. Pat. No. 4,384,083 describes hot-melt adhesives on the basis of granulated, polyether-based, thermoplastic polyurethanes and granulated polyaminoamides. In this patent it is described that the (isocyanate-terminated) polyurethane component and the polyaminoamide component are mixed in granulate form and then, while fusing, are firstly subjected to low shear and then to high shear. The extrudate is then either to be applied directly onto the substrate to be adhesion-bonded or it can be granulated into pellets and used later. The extrudate can moreover be prepared in the form of preformed film or in the form of powder, or it can also be dissolved in solvent. Pourable or free-flowing, one-component, moisture-curing hot-melt adhesives are not disclosed in this document either.

DE 195 41 923 describes a reactive system in granulate form on the basis of resin/polyurethane/EVA mixtures containing a reactive acrylate, epoxy resin or (blocked) isocyanate groups as well as hydroxy components. This system is intended to be capable of crosslinking by thermal means.

EP 832 953 describes a pulverulent reactive polyurethane composition on the basis of a blocked polyurethane prepolymer as well as non-functional urethane compounds based on monoisocyanates and monohydric or polyhydric alcohols or amines or alternatively polyisocyanates and monofunctional alcohols or amines. Textile bonded joints and also chill-casting processes ("slush molding") are specified as a use for this hot-melt resin.

WO 93/25599 describes a process and mixtures of substances for producing reactive hot-melt compounds, which may be used, above all, as hot-melt adhesives, from meltable hydroxy-functional or amino-functional polymers or polymer mixtures which pass over into the liquid state at temperatures above 40 degrees C. and pulverulent, solid, surface-deactivated polyisocyanates. This document discloses on page 16 that carrier-free, reactive hot-melt compounds are obtained from the aforementioned compositions in the form of films, caterpillars, meshes, as granulate or as an unformed body by the liquid, uncrosslinked adhesive being applied onto a carrier which bears a non-adhering or adhesive surface and which is provided superficially with a release agent. After the adhesive has cooled, it can be released from the surface of the carrier and either stored temporarily or applied onto the substrate surface to be attached by adhesion. According to this document, reactive hot-melt powders are obtained by the liquid mixture being extruded onto a moving, adhesive coated belt conveyor and cooled there to below the melting point. After solidification, the hot-melt adhesive can be released from the conveyor belt and comminuted in accordance with known methods, e.g. by cold milling, so as to form granulate or powder and can optionally be sieved into the desired fractions. Moisture-curing hot-melt adhesives in granulate form, however, are not disclosed in this document.

In the paper by V. Neuenhaus entitled "Kapazitive Füllstandsüberwachung an Granulatbehältern", Adhäsion, Kleben & Dichten, number 1-2, 2001, pp 26-28, it is explained that moisture-curing, one-component hot-melt adhesives cannot be granulated, on account of their strong reactivity with moisture.

In view of this state of the art, the inventors have set themselves the task of making available one-component, moisture-reactive hot-melt-adhesive compositions that are capable of being produced and used in free-flowing or pourable form.

SUMMARY OF THE INVENTION

The present invention provides hot-melt adhesive compositions in the form of a granulate or powder, whereby at least some of the polymeric constituents contain moisture-reactive groups.

A further subject of the present invention is a process for producing a moisture-curing hot-melt adhesive granulate or powder that includes the following process steps:
a) fusing the hot-melt adhesive composition and heating the melt to temperatures between 110 degrees C. and 180 degrees C., preferably 130 degrees C. to 150 degrees C., subject to exclusion of moisture;
b) extruding this melt through dies with a diameter from 0.5 mm to 30 mm, preferably from 2 to 10 mm, onto a cooled surface, subject to exclusion of moisture;
c) cooling the granulate, subject to exclusion of moisture, whereby the composition solidifies;
d) removing the cooled hot-melt adhesive granulate and optionally post-crystallizing in an agitated, temperature-controlled, moisture-proof receptacle such as, for example, a fluidized bed, a vibrating trough or a rotary drum until the granulate particles have consolidated to such an extent that they no longer stick together in the following step; and
e) filling the granulate into moisture-tight packages, subject to exclusion of moisture.

A further subject of the present invention is a process for bonding planar objects or moldings that comprises the following process steps:
a.) homogenizing and fusing the reactive granulate or powder, optionally in an inert atmosphere, subject to exclusion of moisture and/or oxygen, by using a heatable mixing unit optionally with high shear;
b.) extrusion of the homogenized reactive thermoplastic mixture optionally through a shaping die onto at least one surface of a sheet material or molding;
c.) joining a second, matching sheet material or molding onto the applied layer of the reactive mixture;

d.) optionally, mechanical fixing of the joined sheet materials or moldings; and
e.) cooling the composite system thus formed to room temperature, whereby the reactive hot-melt-adhesive composition solidifies and cures, subject to crosslinking.

In principle, a plurality of moisture-reactive hot-melt adhesives are suitable for the production of pourable or free-flowing, moisture-curing hot-melt-adhesive compositions. For efficient storage, however, the particles of the hot-melt adhesive must not display any strong cold flux, so that the particles do not stick to one another and remain free-flowing or pourable during storage. For efficient production it is moreover important that the particles solidify so quickly after their shaping that they can be conveyed onward and packaged without losing their pourability or free-flowing property.

In this connection, free-flowing or pourable means that the granulate still "flows" through an opening with a diameter of 5 cm by reason of its own weight, even after storage for 4 months, but at least for 2 months, at temperatures up to +40 degrees C. with an intrinsic pressure of about 30 cm fill height.

Although, in principle, the pourable or free-flowing, moisture-curing hot-melt adhesive compositions according to the invention can also be produced in powder form, the granulate form or tablet form ("pellet") is preferred. The granulate or the pellets have a grain diameter from 0.5 mm to 30 mm, preferably from 2 to 10 mm. The grain size is determined in this case by sieve analysis. The grain preferably has a globular or lenticular shape, but it may also be elliptical or cylindrical.

In addition to the aforementioned aggregate forms constituted by "powder", granulate or tablet form, the pourable or free-flowing, moisture-curing hot-melt adhesive compositions according to the invention may also contain larger formed pieces, e.g. cushion-shaped or cylindrical particles with a length of up to 60 mm. In this connection the last-named formed pieces preferably have a core/shell structure, in which case the reactive core material definitely does not have to be tack-free or block-free but only the external shell material is tack-free or block-free. Core/shell material of such a type can be produced, inter alia, by co-extrusion processes or by chemical surface deactivation, as will be explained in greater detail further below.

In order to enable an efficient conversion of the hot-melt adhesive composition into the particle form, the hot-melt adhesive composition must not be too highly viscous. The viscosity of the melt should lie within a range from 3 Pa.s at 110 degrees C. to 80 Pa.s at 180 degrees C. Typical values are, for example, 90 Pa.s at 150 degrees C. to 10 Pa.s at 130 degrees C.; a preferred range lies between 10±5 Pa.s at 150 degrees C.±20 degrees C. Ordinarily the viscosity is measured at the specified temperatures with a Brookfield viscosimeter of the Thermosel® type. If the viscosity of the hot-melt adhesive composition exhibits the aforementioned viscosity ranges, this guarantees that the melt can be discharged at temperatures between 110 degrees C. and 180 degrees C., preferably between 130 degrees C. and 150 degrees C., subject to exclusion of moisture, with a sufficiently low conveying pressure through a plurality of dies having a diameter from 0.5 to 30 mm, preferably from 2 to 10 mm. In this connection the melt is pressurized in pulsed manner, so that individual drops are able to emerge through the dies. The particle size of the granulate is determined in this case by the diameter of the die and the length of the pressure pulse as well as the absolute pressure head and may be varied within wide limits with a view to achieving an optimal granulate diameter; conveying is ordinarily effected by a piston pump with reciprocating pistons. After emerging from the dies, the drops fall in a dry atmosphere onto a cooled surface and begin to solidify there. In this connection the cooling capacity of the surface and also the rate of solidification of the hot-melt adhesive granulates determine the dwell-time of the granulate on the cooled surface. Subsequently the cooled hot-melt adhesive granulate is routed from the cooled surface into the filling device from the cooled surface by a stripper device or doctor blade. The solidification of the cooled hot-melt adhesive granulate can optionally be completed by post-crystallization in an agitated, temperature-controlled, moisture-tight receptacle, such as, for example, a fluidized bed, a vibrating trough or a rotary drum. What is important here is that the granulate particles are no longer able to stick together prior to being filled into the packaging.

In this case the hot-melt adhesive composition may either be conveyed directly from the production container, e.g., a tank reactor or a tubular reactor, into the granulating or tabletting device; the hot-melt adhesive composition may, however, also be stored temporarily in a storage container.

The rate of solidification or crystallization of the hot-melt adhesive composition can be influenced within wide limits by the appropriate selection of the polymeric constructional units; thus rapidly crystallizing polyester polyols or polyether polyols by way of structural components of the polyurethane hot-melt adhesives favor the solidification or crystallization behavior favorably. The solidification capacity or crystallizability can be accelerated still further by means of nucleating agents that are known in principle. Such nucleating agents are, for example, titanium dioxide, highly dispersed silicic acid, carbon black, talc, chalks or crystalline, reactive or non-reactive waxes. The addition of the last-named non-reactive waxes for non-reactive hot-melt adhesives is known, for example, from G. Habenicht, "Kleben, Grundlagen, Technologie, Anwendungen", 2nd Edition, 1990, in Chapter 2.7.6. According to this work, important wax types are paraffin waxes with melting-points within the range from 45 to 70 degrees C. and molecular weights between 225 and 500, microcrystalline waxes with melting-points within the range from. 60 to 95 degrees C., synthetic Fischer-Tropsch waxes with melting-points from 100 to 115 degrees C., and also polyethylene waxes with melting-ranges between 85 degrees C. and 140 degrees C. and molecular weights within the range from 500 to 3,500. Reactive waxes are known, for example, from U.S. Pat. No. 5,472,785. Reactive waxes of such a type contain hydroxyl, carboxyl, isocyanate, thiol, amino, epoxy or vinyl groups. The molecular weights of such reactive waxes are between 400 and 10,000.

The rate of solidification or crystallization of the hot-melt adhesive compositions should in this case bring about a rapid tack-free surface of the particles after the granulation or tabletting, so that the particles of the hot-melt adhesive exhibit blocking resistance, also without separate surface treatment.

The agglutination or agglomeration of the granulate particles can also be effected by a superficial treatment of the surface of the granulate or tablet. To this end, the granulate particles are coated superficially with a suitable release agent; this release agent may be, for example, talc, pyrogenic silicic acid, molecular-sieve powder, carbon black, polyethylene powder, ethylene-vinyl-acetate powder or another fine-particle, non-reactive polymer powder. In principle, release agents that are fusible at slightly elevated temperature, such as waxes for example, may also be sprayed onto the surface of the granulate. Examples of such waxes are polyolefin waxes, in particular polyethylene waxes or even Fischer-Tropsch waxes. An essential selection criterion for the coating agent is that the surface of the particles is not tacky at room temperature or at storage temperature and that the layer of release agent is capable of being mixed into the binder system without incompatibilities in the course of application of the adhesive. In this connection, this external, non-tacky layer is to cover the core of the granulate so completely that it is possible to speak of a continuous superficial layer, i.e., as a rule more than 90%, in particular more than 99%, of the surface of the granulate is coated.

Besides the aforementioned sputtering or spray-on processes, a core/shell structure of the granulate particles consisting of a reactive core of a thermoplastic polymer composition with reactive groups of the aforementioned type and a non-reactive, tack-free shell region can also be produced by co-extrusion. A further possibility is the chemical deactivation of the surface, for example in the case of the reactive polyurethane systems, by superficial deactivation of the reactive particles by reaction of the isocyanate groups of the polymer composition with monoamines or polyamines, as a result of which a tack-free urea shell is generated on the granulate particles.

The rate of solidification or crystallization of the particulate hot-melt adhesive composition or, to be more exact, the process whereby the granulate particles become tack-free is at the same time of very great significance for the proccessability and efficient production thereof.

This behavior can be optimized with metrological assistance, by the rate of crystallization or solidification or the process whereby the hot-melt adhesive composition to be optimized becomes tack-free being tracked by measurement by means of thermal methods. Suitable for this purpose are, for example, thermoanalytical methods such as differential thermal analysis, in particular DSC (Differential Scanning Calorimetry), Dynamic Mechanical Thermal Analysis (DMTA), Thermomechanical Analysis (TMA) and also by measuring the modulus of elasticity or the storage modulus as a function of cooling-time or cooling-temperature. In the simplest case, the solidification behavior can also be determined and optimized via the determination of the Shore-A hardness via the cooling-time or cooling-temperature. Such a process is, for example, the subject of DIN 53505. According to this standard, the change in the Shore-A hardness is, for example measured under isothermal conditions at predetermined time-intervals until a maximum hardness is obtained. The Shore-A hardness is then plotted against time, in order to obtain a curve of the rate of crystallization; on this subject, see also Adhesives Age, January, 2001, page 23.

In this case the polyurethane binder of the particulate reactive hot-melt adhesive compositions according to the invention is preferably built up, in a form known as such, from monomeric diisocyanates and polyols.

Monomeric diisocyanates in the sense of this invention are those aromatic, aliphatic or cycloaliphatic diisocyanates which have a molecular weight of less than 500. Examples of suitable aromatic diisocyanates are all the isomers of tolylene diisocyanate (TDI), either in pure-isomer form or as a mixture of several isomers, 1,5-naphthalene diisocyanate (NDI), 1,4-naphthalene diisocyanate (NDI), 4,4'-diphenylmethane diisocyanate (MDI), 2,4'-diphenylmethane diisocyanate as well as mixtures of 4,4'-diphenylmethane diisocyanate with the 2,4' isomer, xylylene diisocyanate (XDI), 4,4'-diphenyldimethylmethane diisocyanate, di- and tetraalkyldiphenylmethane diisocyanate, 4,4'-dibenzyl diisocyanate, 1,3-phenylene diisocyanate, 1,4-phenylene diisocyanate. Examples of suitable cycloaliphatic diisocyanates are the hydrogenation products of the: aforementioned aromatic diisocyanates, such as, for example, 4,4'-dicyclohexylmethane diisocyanate ($H_{12}$MDI), 1-isocyanatomethyl-3-isocyanato-1,5,5-trimethylcyclohexane (isophorone diisocyanate, IPDI), 1,4-cyclohexane diisocyanate, hydrogenated xylylene diisocyanate ($H_6$XDI), 1-methyl-2,4-diisocyanatocyclohexane, m- or p-tetramethylxylene diisocyanate (m-TMXDI, p-TMXDI) and dimer fatty acid diisocyanate. Examples of aliphatic diisocyanates are 1,4-tetramethoxybutane diisocyanate, 1,4-butane diisocyanate, 1,6-hexane diisocyanate (HDI), 1,6-diisocyanato-2,2,4-trimethylhexane, 1,6-diisocyanato-2,4,4-trimethylhexane, lysine diisocyanate as well as 1,12-dodecane diisocyanate ($C_{12}$DI).

By way of polyols in this connection, use may be made of a large number of polyhydroxy compounds of relatively high molecular weight. Preferentially suitable by way of polyols are the vitreously solid/amorphous or crystalline polyhydroxy compounds that are liquid at room temperature with two or three, respectively, hydroxyl groups per molecule within the molecular-weight range from 400 to 20,000, preferably within the range from 1,000 to 6,000. Examples are difunctional and/or trifunctional polypropylene glycols; random and/or block copolymers of ethylene oxide and propylene oxide may also be employed. A further group of polyethers to be employed preferentially are the polytetramethylene glycols (poly(oxytetramethylene)glycol, poly-THF) that are produced, for example, by the acidic polymerization of tetrahydrofuran; in this case the molecular-weight range of the polytetramethylene glycols lies between 600 and 6,000, preferably within the range from 800 to 5,000. Suitable furthermore by way of polyols are the liquid, vitreously amorphous or crystalline polyesters that can be produced by condensation of dicarboxylic or tricarboxylic acids such as, for example, adipic acid, sebacic acid, glutaric acid, azelaic acid, suberic acid, undecanedioic acid, dodecanedioic acid, 3,3-dimethylglutaric acid, terephthalic acid, isophthalic acid, hexahydrophthalic acid, dimer fatty acid or mixtures thereof with low-molecular diols or triols such as, for example, ethylene glycol, propylene glycol, diethylene glycol, triethylene glycol, dipropylene glycol, 1,4-butanediol, 1,6-hexanediol, 1,8-octanediol, 1,10-decanediol; 1,12-dodecanediol, dimer fatty alcohol, glycerin, trimethylolpropane or mixtures thereof.

A further group of the polyols to be employed in accordance with the invention are the polyesters based on epsilon-caprolactone, also called "polycaprolactones".

But use can also be made of polyester polyols of oleochemical origin. Such polyester polyols can, for example, by produced by complete ring opening of epoxidized triglycerides of an at least partially olefinically unsaturated fatty-acid-containing fat mixture with one or more alcohols with 1 to 12 C atoms and subsequent partial transesterification of the triglyceride derivatives to form alkyl ester polyols with 1 to 12 C atoms in the alkyl residue. Further suitable polyols are polycarbonate polyols and dimer diols (manufactured by Henkel) as well as castor oil and the derivatives thereof. The hydroxy-functional polybutadienes, such as are available, for example, under the trade name "poly-bd", may be employed by way of polyols for the compositions according to the invention.

Suitable furthermore by way of polyols are linear and/or weakly branched acrylic-ester copolymer polyols which, for example, can be produced by the radical copolymerization of acrylic esters or methacrylic esters with hydroxy-functional compounds of acrylic acid and/or of methacrylic acid, such as hydroxyethyl (meth)acrylate or hydroxypropyl (meth)acrylate. On account of this manner of production, the hydroxyl groups in these polyols are., as a rule, randomly distributed, so that in this case it is a question either of linear polyols or of weakly branched polyols with an average OH functionality. Although the difunctional compounds are preferred for the polyols, use can also be made of polyols of higher functionality, at least in subordinate amounts.

With the use of the polyurethane compositions according to the invention by way of particulate reactive hot-melt adhesives the polyol components are selected in such a way that the composition is solid at room temperature, solidifies rapidly in granulate form under the conditions of extrusion and exhibits a non-tacky surface at room temperature or storage temperature. This can be accomplished, on the one hand, by solid, amorphous and/or solid, crystalline polyhydroxy compounds being employed, but it can also be accomplished by a considerable portion of short-chain polyhydroxy compounds being used concomitantly, since by virtue of the high concentration of urethane groupings these compositions are likewise solid at room temperature and solidify very quickly upon cooling. Selection criteria for the suitable polyols are to be found, for example, in the aforementioned paper by H. F. Huber and H. Müller or in the script of a lecture by the same authors ("Leitlinien für die Formulierung von reaktiven Schmelzklebstoffen", 11th Münchener Klebstoff-und Veredelungsseminar, October, 1986)

In addition to the aforementioned polyurethane compositions with reactive isocyanate end groups, the hot-melt adhesives according to the invention may also contain, by way of moisture-reactive groups, silanol groups, alkoxysilane groups, acetoxysilane groups, silazane groups, oximatosilane groups or mixtures thereof. Such reactive polymers can be produced by conversion of the corresponding isocyanate-terminated prepolymers with amino-functional, mercapto-functional or hydroxy-functional silanes. In principle, they can also be produced by other means, by conversions, analogous to polymerization, of polyaminoamides with amino-functional, mercapto-functional or hydroxy-functional silanes. A further possibility is the use of corresponding (meth)acrylate copolymers with incorporated reactive isocyanate groups or silane groups.

A further possibility for the hot-melt adhesives to be produced or used in granulate form in accordance with the invention is constituted by so-called hybrid systems which, in addition to the aforementioned moisture-curing groups, also contain groups that are capable of being cured by radiation. These groups may be either olefinically unsaturated groups, in particular acrylate or methacrylate groups, or epoxide groups. In the case of the compositions that contain polymers or monomers with olefinically unsaturated groups, the composition must, in addition, contain an initiator that is capable of being activated by radiation and that can generate free radicals. In the case of the compositions containing epoxide groups, this initiator that is capable of being activated by radiation should be selected from the group comprising the ammonium, sulfonium or phosphonium compounds that are capable of being activated by radiation. Both types of photoinitiator are known in principle.

In the case of the polyurethane hot-melt adhesive compositions with free isocyanate groups, in a particularly preferred embodiment a polyurethane composition with no content, or very low content, of monomeric, low-molecular diisocyanates can be employed. Such hot-melt adhesive compositions are, for example, the subject matter of International application PCT/EP00/11771 (published as WO 01/40342). The teaching of this application with regard to the compositions having low residual monomer content is expressly the subject matter of the present invention.

The particulate compositions according to the invention may, optionally in addition, contain catalysts that accelerate the formation of the polyurethane prepolymer in the course of its production and/or the crosslinking under the influence of moisture after application of the adhesive. Suitable in this connection by way of catalysts that can be employed in accordance with the invention are, in particular, the catalysts named in the aforementioned PCT/EP00/11771 on pages 11 to 13 in the amounts specified therein.

Moreover, the composition according to the invention may, optionally in addition, contain stabilizers, coupling additives such as tackifying resins, fillers, pigments, plasticizers and/or non-reactive thermoplastic polymers. To be understood as being "stabilizers" in the sense of this invention are, on the one hand, stabilizers that bring about stability of the viscosity of the polyurethane prepolymer during production, storage and application. Suitable for this purpose are, for example, monofunctional carboxylic acid chlorides, monofunctional highly reactive isocyanates, but also non-corrosive inorganic acids; in exemplary manner, mention may be made of benzoyl chloride, toluenesulfonyl isocyanate, phosphoric acid or phosphorous acid. Furthermore, anti-oxidants, UV stabilizers or hydrolysis stabilizers are to be understood as being stabilizers in the sense of this invention. The selection of these stabilizers is guided, on the one hand, by the main components of the composition and, on the other hand, by the application conditions as well as the loadings of the cured product to be expected. If the polyurethane prepolymer is built up predominantly from polyether constructional units, anti-oxidants, optionally in combination with UV-screening agents, are principally necessary. Examples of these are the commercially available sterically hindered phenols and/or thioethers and/or substituted benzotriazoles or the sterically hindered amines of the HALS type ("Hindered Amine Light Stabilizer").

If substantial constituents of the polyurethane prepolymer consist of polyester constructional units, hydrolysis stabilizers, e.g. of the carbodiimide type, may be employed.

If the compositions according to the invention are employed as laminating adhesives or hot-melt adhesives, they may also contain tackifying resins such as, for example, abietic acid, abietic esters, terpene resins, terpene phenolic resins or hydrocarbon resins as well as fillers (e.g. silicates, talc, calcium carbonates, clays or carbon black), plasticizers (e.g. phthalates) or thixotroping agents (e.g. bentonites, pyrogenic silicic acids, urea derivatives, fibrillated short fibers or short pulp (fibers) or coloring pastes and pigments.

By way of thermoplastic polymers in this case, use is preferably made of low-molecular polymers of ethylenically unsaturated monomers. Concrete examples of these are (co)polymers formed from one or more of the following monomers: $C_1$-$C_{18}$ alkyl esters of acrylic acid or of methacrylic acid, acrylic acid, methacrylic acid, ethylene, vinyl acetate, vinyl propionate, vinyl versatate, vinyl ether, alkyl fumarates, alkyl maleates, styrene, alkylstyrene, acrylonitrile and/or butadiene or isoprene. Low molecular weight in this context means an average molecular weight below 60,000; the molecular weight of such thermoplastic polymers is preferably between 10,000 and 40,000.

The moisture-reactive hot-melt adhesives in particle form according to the invention are particularly suitable for the simple bonding of planar objects or moldings, since the homogenizing and fusing of the reactive granulate or powder can be performed with conventional heatable mixing units such as, for example, extruders (on account of their high shear). Extrusion of the homogenized reactive thermoplastic mixture is then optionally effected through a shaping die, with an applicator roll, in a spraying process or with a doctor blade onto at least one surface of a sheet material or molding to be joined. The second, matching sheet material or molding is joined onto the applied layer of the reactive mixture, and the two parts to be joined are optionally press-molded for a short time and/or fixed mechanically. After cooling and solidification of the layer of adhesive at temperatures below the melting-range, the initial strength of the bonded joint is achieved by the solidification of the hot-melt adhesive; the final strength is obtained after curing by reaction with the surrounding moisture. In the case of the hybrid systems, part of the curing can optionally be effected by irradiation of the layer of adhesive with electromagnetic irradiation in the form of UV, electron or NIR. (near-infrared) radiation. If a part to be joined is transparent in respect of the electromagnetic radiation, the electromagnetic irradiation can also be effected after the parts have been joined.

The moisture-reactive hot-melt adhesives in particle form according to the invention can also be mixed and applied in particularly simple manner with other particulate hot-melt-adhesive compositions in reactive or non-reactive form as a mixture. As a result, the processing properties, setting properties and curing properties can be varied within wide limits without great effort Optionally, coloring pigments or catalysts in granulate form or powder form can also be added. By this means, the fabricator can be given the opportunity to adapt reactive hot-melt-adhesive compositions as regards their processing properties to the concrete applications in highly flexible manner without major effort in terms of plant technology.

In this way the user can also adapt the setting behavior of the hot-melt adhesive compositions to the climatic conditions, i.e. in cold, dry winter months he can appropriately modify more strongly accelerated compositions by addition of an accelerator granulate without the main component of the hot-melt-adhesive composition having to be altered. Moreover, a rapid change from reactive to non-reactive hot-melt adhesives in particle form is possible on the same application line without the plant having to be cleaned in between.

The process according to the invention for bonding planar objects or moldings with the aid of the reactive hot-melt-adhesive granulates or powders is suitable, in particular, in the wood-processing industry in the production of wood components and furniture components or window profiles for the bonding and coating of wood materials and wood-like materials such as chipboard, MDF (medium-density fibreboard), HDF (high-density fibreboard), OSB (oriented structural board) and liquid wood to one another or to plastics and metals.

In the case of the encasement of profiles, use can be made of the particulate hot-melt adhesives according to the invention for the bonding of profiled core materials made of wood, chipboard, MDF, liquid wood, aluminium and PVC with paper foils, plastic films and veneers. Further examples are the edge bonding or machining (straight edge, soft forming and post-forming) of surface-coated chipboards, MDF sheets with edge materials made of solid wood, veneer, resin-coated papers, plastic edges made of ABS, polypropylene, polyacrylate and PVC, as well as aluminum edges, or by the process of surface bonding (flat lamination) for the connection of planar flat substrates made of wood, wood-like materials, resin-coated papers, plastics and metals. This process is also suitable for the efficient production of other assemblies such as, for example, solar collectors, facade units for structures, panes of casting resin, or also for the production of 2-pane or multi-pane laminated insulating glasses. Moreover, the process according to the invention for laminating components or foils with appropriate plastic films, metal foils or paper foils and laminates and also for laminating or bonding textile sheet materials in the form of non-wovens, fleeces, woven fabrics or knitted fabrics and such like. Further examples of the use, according to the invention, of the reactive hot-melt adhesives in particle form are, in the field of automotive engineering, the assembly applications such as clip-bonds, laminating bonded joints for interior trim or dashboards and rear parcel shelves in cars; in bookbinding, coating of the spine can be effected with the reactive particulate hot-melt adhesives according to the invention. Further industrial applications of the processes according to the invention are the bonding of filter components, the planar lamination of components in caravan, trailer and container construction or in the manufacture of sports equipment (e.g. the production of skis). Applications in the lamination of textiles can also include the bonding of semipermeable membranes with other textile materials. Further applications according to the invention are the casting of plugs or the production of moldings for the cable, electrical or electronic industries (on this subject, see DE 44 46 027 A) and also, in shoe manufacture, the bonding of soles to the upper part of the shoe or for bonding components of the shoe. Moreover, the granulates according to the invention can be used for the production of drying agents according to the disclosure of DE 199 52 089 C1.

The invention will be presented below on the basis of a number of schematic experiments, whereby the selection of the examples is not intended to constitute a limitation of the scope of the subject-matter of the invention. They show, in exemplary manner only, the mode of action of the particulate hot-melt adhesives to be used in accordance with the invention in granulate, tablet or powder form.

In the following examples all quantitative data are percentages by weight or parts by weight, unless stated.

EXAMPLES

Example 1

From a polyol mixture containing 21.4 wt. % of a polyester diol, hydroxyl value 32, softening-point (ring and ball, ASTM E 28) 72 degrees C., 26.2 wt. % of a polyester diol, hydroxyl value 27, softening-point (ring and ball) 62 degrees C., 22.7 wt. % of a polyester diol, hydroxyl value 33, softening-point (ring and ball) 76 degrees C., 10.2 wt. % of a polyester diol, hydroxyl value 56, $T_g<-20$ degrees C. and from a polyether diol (polypropylene glycol) hydroxyl value 112, 10.26 wt. % diphenylmethane diisocyanate as well as 5.1 wt. % EVA (VA proportion 28%), subject to addition of 0.04 wt. % benzoyl chloride, a prepolymer mixture was produced, by a method known as such, by way of base material for a reactive hot-melt adhesive with reactive isocyanate groups. NCO content 1.13%, viscosity 24 Pa.s at 130 degrees C.

By varying the polyester polyols and the polyether polyols as well as the OH:NCO ratios, further reactive polyurethane hot-melt adhesive compositions were produced.

The rate of solidification of these hot-melt-adhesive compositions was determined by measuring the Shore-A hardness as a function of time. The results are summarized in the following Table 1.

TABLE 1

| Time (min) | Example 2 | Example 3 | Example 4 | Example 5 | Example 6 | Example 7 | Example 8 | Example 9 | Example 10 | Example 11 | Example 12 | Example 13 | Example 14 | Example 15 | Example 16 |
|---|---|---|---|---|---|---|---|---|---|---|---|---|---|---|---|
| 3 | | | 52 | | 0 | | | | | | 90 | | | 7 | 11 |
| 5 | 56 | 0 | 61 | | | | | | | | | 5 | | | |
| 6 | 66 | | | | | | | | | | 6 | 15 | 3 | 15 | 13 |
| 7 | | | 69 | | | | | | | | | | | | |
| 8 | 70 | | | | | | | | | | | | | | |
| 9 | | 0 | | | | | | | | | | | | | |
| 10 | | | | 1 | | | | | 5 | | | 50 | 9 | | |
| 11 | 74 | | | | | | | | | | | | | | |
| 12 | | | | | | | | | | | 8 | | | | |
| 14 | | | | | | | | | | | | | | 23 | 15 |
| 15 | 75 | | | 5 | | | | | 10 | | | 16 | | | |
| 17 | | | | | | | | | | | | | | 28 | |
| 18 | | | | | | | | | | | | 18 | | | |
| 20 | | | | 10 | | | | | | | | | | | |
| 23 | | | | | | | | | | | 11 | | | | |
| 24 | | | | | | | | | | | | | | | |
| 25 | | | | | | | | | | | | | 30 | 35 | |
| 30 | | | | | 8 | 0 | 5 | 10 | 20 | | | | | | |

For the granulating or tabletting experiments, those compositions were selected which after 15 minutes exhibited a Shore-A hardness of at least 15 (Examples 2, 4, 13, 14-16). For the tabletting, the adhesive melt was applied from a heated storage container onto a cooled surface through a die bar. Metering was effected in this case via a piston pump; the die bar and the cooled plate were located in a sealed chamber, subject to exclusion of moisture. After the tablets had solidified, they were stripped off from the cooled plate and conveyed into a collecting vessel which was subsequently closed in moisture-tight manner. The granulate had a mean particle diameter of 7±1 mm.

The granulate was subsequently subjected to a long-term-storage test and was also compared as regards its technical adhesive properties in a comparison with a conventional hot-melt adhesive of analogous composition in bulk form.

The stability in storage of the granulate from Example 2 was assessed on the basis of the melt viscosity, the open time and the setting-time. As is evident from the following data, the viscosity of the granulate increases only very slightly; the open time and the setting-time of the hot-melt adhesive also change only within close limits, so the hot-melt adhesive in granulated form exhibits excellent stability in storage. In the block test the granulate remained pourable even at temperatures up to 45 degrees C.; as from 50 degrees C. slight adhesion of the granulate particles was observed; as from 60 degrees C. the product began to melt.

| Time | Viscosity at 130 degrees C. | Open time | Setting-time |
|---|---|---|---|
| immediately | 21,600 mPa · s | 50 s | 38 s |
| 2 weeks | 27,100 mPa · s | 60 s | 45 s |
| 3 weeks | 29,500 mPa · s | n.a. | n.a. |
| 4 months | 25,000 mPa · s | 65 s | 65 s |

The granulate of Example 2 was tested with regard to its proccessability in the case of the encasement of window profiles:

Experimental Conditions:

| | |
|---|---|
| Machine: | Friz PU 30 |
| Profile: | Aluplast white |
| Foil: | Renolit Standard |
| Primer: | 6B-23 (Henkel Dorus) |
| Feed: | 15 m/min |
| Temperature of doctor blade: | 130 degrees C. |

Processing:

The granulate was charged directly into the doctor blade and fused therein. Processing with the aid of the doctor blade was effected without difficulty and without conspicuous incident.

Test Results
Build-up of peel strength (N/mm) after:

| | |
|---|---|
| 10 min | 1.1 P, CF |
| 1 h | 1.3 P, CF |
| 2 h | 1.4 P, CF |
| 4 h | 1.5 P, CF |
| 8 h | 2.0 P, CF |
| 1 d | 3.5 FC |
| 2 d | 4.2 FC |
| >7 d | 4.5 FC |

Explanation: P—peels, CF—cohesion failure, FC—foil crack without peeling

| | |
|---|---|
| Peel strength after ageing: rel. atmospheric moisture | 240 h at 70 degrees C./95% |
| Peel value after ageing: Comparative value 1 | 3.3 N/mm, peels, CF |
| Peel value after ageing: | 3.8 N/mm, peels, CF |

These experimental results show that the hot-melt adhesive in granulate form is just as processable as a hot-melt adhesive of like composition in compact form (Comparative value 1). The ageing behaviour of the granular hot-melt adhesive also leads to results comparable to those of a compact hot-melt adhesive of the same type (Comparative value 1).

In like manner, the granulates of Examples 13 and 14 were tested in respect of the application constituted by window-profile encasement. In this case the following results were achieved:

| Characteristic-value test | Example 13 | Example 14 |
|---|---|---|
| Viscosity (130° C., Pa · s) | 25.5 | 27.0 |
| Open time (sec) | 32 | 34 |
| Setting-time (sec) | 10 | 8 |
| Viscosity (Sandmeyer) (130° C., Pa · s) | 86.1 | 28.6 |

Encasement Experiment:

| | |
|---|---|
| Machine: | DTC-2 Friz |
| Feed: | 15 m/min |
| Temperature of doctor blade: | 130 degrees C. |
| Profile-surface temperature: | 48-51 degrees C. |
| Profile: | Aluplast |
| Foil: | Renolit MBAS 2 |
| Application of adhesive: | 50 g/min |

Test results: Peel strength (N/20 mm) after

| Adhesives | 10 min | 1 h | 4 h | 8 h | 1 d | 2 d | 7 d |
|---|---|---|---|---|---|---|---|
| Example 13 | 30 | 32 | 32 | 34 | 64 | 78 FC | 78 FC |
| Comparison 2 | 23 | 23 | 30 | 53 | 92 FC | — | 92 FC |
| Example 14 | 17 | 12 | 12 | 11 | 20 | 33 | 42 |
| Comparison 3 | 10 | 10 | 9 | 9 | 9 | 28 | 55 |

All peel values: peels accompanied by cohesion failure
FC: foil crack without peeling The granulates of Examples 13 and 14 also display very similar characteristic values in comparison with conventional compact hot-melt adhesives of like composition (Comparisons 2 and 3).

From the foregoing experimental results it is evident that the hot-melt adhesives according to the invention in granulate form exhibit processing properties and strength properties comparable to those of the conventional reactive hot-melt adhesives of similar composition in compact form. Their advantage over the analogous compositions in bulk form, however, is the simplified handling and storage of the particulate reactive hot-melt adhesives.

What is claimed is:

1. A one part hot-melt adhesive composition in the form of particles and comprised of (a) one or more polymeric constituents, wherein at least one of the polymeric constituents contains one or more isocyanate groups and a polyester component, and (b) at least one tackifying resin; and wherein said particles remain pourable at temperatures up to 45 degrees C.

2. The one part hot-melt-adhesive of claim 1, wherein said particles are in the form of a granulate.

3. A one part hot-melt adhesive composition in the form of particles and comprised of (a) one or more polymeric constituents, wherein at least one of the polymeric constituents contains one or more isocyanate groups and a polyester component, and (b) at least one tackifying resin; and wherein said particles remain pourable at temperatures up to 45 C. and comprise at least one material selected from the group consisting of radiation-curable polymers and monomers.

4. The one part hot-melt adhesive composition of claim 3, wherein the at least one material contains groups selected from the group consisting of olefinically unsaturated groups, epoxide groups and combinations thereof.

5. The one part hot-melt adhesive composition of claim 1, wherein the particles have a particle size of from 0.5 mm to 30 mm.

6. The one part hot-melt adhesive composition of claim 1, wherein the particles have a particle size from 5 microns to 500 microns.

7. The one part hot-melt adhesive composition of claim 1, wherein said composition when melted has a viscosity at 150+/−20° C. of 10+/−5 Pa.s.

8. A process for producing a one part hot-melt adhesive in the form of particles and comprised of (i) one or more polymeric constituents, wherein at least one of the polymeric constituents contains one or more isocyanate groups and a polyester component, and (ii) at least one tackifying resin; and wherein said particles remain pourable at temperatures up to 45 degrees C., comprising the following steps: a) heating the polymeric constituents to a temperature between 110 degrees C. and 180 degrees C. to form a melt, subject to exclusion of moisture; b) extruding the melt through one or more dies with a diameter from 0.5 mm to 30 mm onto a cooled surface, subject to exclusion of moisture; c) cooling the extruded melt, subject to exclusion of moisture, whereby the extruded melt solidifies to form the one part hot-melt adhesive composition in the form of particles; d) removing the particles from the cooled surface; e) filling the particles into a moisture-tight package, subject to exclusion of moisture.

9. The process according to claim 8, wherein the extruded melt is treated after step b) with one or more tackiness-reducing agents.

10. The process according to claim 9, wherein the tackiness-reducing agents are selected from the group consisting of fine-particle dusts in the form of carbon black, highly dispersed silicic acid, polyethylene powder or talc and low-melting waxes and paraffins that are capable of being sprayed on or sputtered on in solid form.

11. The process according to claim 8, wherein said particles are subjected to post-crystallizing in an agitated, temperature-controlled, moisture-proof receptacle.

12. The process according to claim 8, wherein the melt is extruded through one or more dies under pressure in a pulsed manner so that individual drops of the melt are formed.

13. A process for bonding planar objects or moldings, comprising the following steps: a.) homogenizing and fusing the one part hot-melt adhesive composition according to claim 1, subject to exclusion of moisture and/or oxygen, by using a heatable mixing unit; b.) applying a layer of the homogenized and fused one part hot-melt adhesive composition onto at least one surface of a first sheet material or molding; c.) joining a second sheet material or molding onto said layer to form a composite system; and d.) cooling the composite system to room temperature, whereby the one part hot-melt adhesive composition solidifies and cures, subject to crosslinking.

14. The process according to claim 13, wherein the homogenized and fused one part hot-melt adhesive composition in step b) is applied with the aid of an applicator roll or a doctor blade or by spray application.

15. The process according to claim 13, wherein prior to the joining in accordance with step c) the layer of homogenized and fused one part hot-melt adhesive composition is exposed to electromagnetic radiation in the form of UV, electron or NIR radiation.

16. The process according to claim 15, wherein at least one of the first sheet material or molding or the second sheet material or molding is transparent to the electromagnetic radiation and the layer is exposed to the electromagnetic radiation after the joining in accordance with step c).

17. The process according to claim 13, wherein after step c) and before step d) mechanical fixing of the first sheet material or molding and the second sheet material or molding is performed.

18. The process according to claim 13, wherein the homogenized and fused one part hot-melt adhesive composition is extruded through a shaping die when applied in step b).

19. A composite system comprising a first sheet material or molding, a second sheet material or molding, and a solidified, cured layer of the one part hot-melt adhesive composition of claim 1 joining said first sheet material or molding and said second sheet material or molding.

20. The composite system according to claim 19, wherein said composite system is selected from the group consisting of wood parts, furniture parts, window profiles, solar collectors, filters, vehicle parts, books, textiles, composite foils, shoes, sports equipment, structural facade units, casting resin panes, and laminated insulating glasses.

21. The one part hot-melt-adhesive of claim 1, wherein the NCO content is at least 1.13% by weight.

22. The one part hot-melt-adhesive of claim 1, wherein tackifying resin is one or more of abietic acid, abietic esters, terpene resins, terpene phenolic resins and hydrocarbon resins.

* * * * *